United States Patent [19]
Warner

[11] Patent Number: 5,845,922
[45] Date of Patent: Dec. 8, 1998

[54] VEHICLE TOW BAR

[75] Inventor: Joseph G. Warner, Sterling Heights, Mich.

[73] Assignee: The United States of America as represented by the Secretary of the Army, Washington, D.C.

[21] Appl. No.: 769,640

[22] Filed: Dec. 16, 1996

[51] Int. Cl.$^6$ ................................ B60P 3/00; B60D 13/00
[52] U.S. Cl. .......................... 280/493; 280/402; 280/42; 280/491.1; 414/563
[58] Field of Search .......................... 280/493, 15, 491.1, 280/502, 42, 475, 503, 24, 407, 414.5, 425.1, 402; 407/101, 96, 92, 91; 414/563

[56] References Cited

U.S. PATENT DOCUMENTS 3,315,975   4/1967   Marple ........................................ 280/34
3,885,815   5/1975   Kniff ........................................ 280/402

*Primary Examiner*—Brian L. Johnson
*Assistant Examiner*—Lynda Jasmin
*Attorney, Agent, or Firm*—Peter A. Taucher; David L. Kuhn

[57] ABSTRACT

A tow bar connecting a towed vehicle a towing vehicle has a shaft forking into tines whose hooks to engage the axle or undercarriage of the towed vehicle. A cradle or bracket slidable on the shaft engages the frame, bumper or other part of the towed vehicle. An arm is pivoted to the shaft by the arm's disk-like termini, which rotatingly sandwich the shaft's disk-like terminus. The arm's termini have satellite apertures which register with complementary satellite apertures in the shaft's terminus. Registering of the respective satellite apertures occurs at selected relative angular portions of the arm and shaft. Pins through the registered satellite apertures lock the arm and shaft in a given relative angular position. A jack raises the shaft once the tow bar is on the towed vehicle. The tow bar includes an eye or the like for attaching the tow bar to the hitch of the towing vehicle.

8 Claims, 2 Drawing Sheets

VEHICLE TOW BAR

GOVERNMENT USE

The invention described here may be made, used and licensed by or for the U.S. Government for governmental purposes without paying me any royalty.

BACKGROUND AND SUMMARY

Presently, when one needs to lift one end of a vehicle in order to tow it, one uses specially equipped vehicle having a crane or else a dolly must be placed under one axle of the towed vehicle. I have invented an articulating tow bar that eliminates the need for a specially equipped vehicle or a dolly. The articulated tow bar is easily carried by ordinary vehicles.

My tow bar has a shaft bifurcating into tines at whose ends are hooks to engage the axle or undercarriage of the towed vehicle. A cradle, bracket or like element slides on the shaft and engages the frame, bumper or other part of the towed vehicle. An arm is pivoted to the shaft by the arm's disk-like termini. The arm's termini rotatingly sandwich the shaft's complementary disk-like terminus. The arm's termini have satellite apertures registerable with complementary satellite apertures in the shaft's terminus. Registry occurs at selected angular portions of the arm with respect to the shaft. Lock pins are passed through the registered satellite apertures to lock the arm and shaft in a given relative position. A jack, which is pivoted to the shaft, raises the shaft once the tow bar is on the towed vehicle. The tow bar arm has an eye for engaging the pintle of a hitch assembly on the towing vehicle.

DETAILED DESCRIPTION

Figure 1:
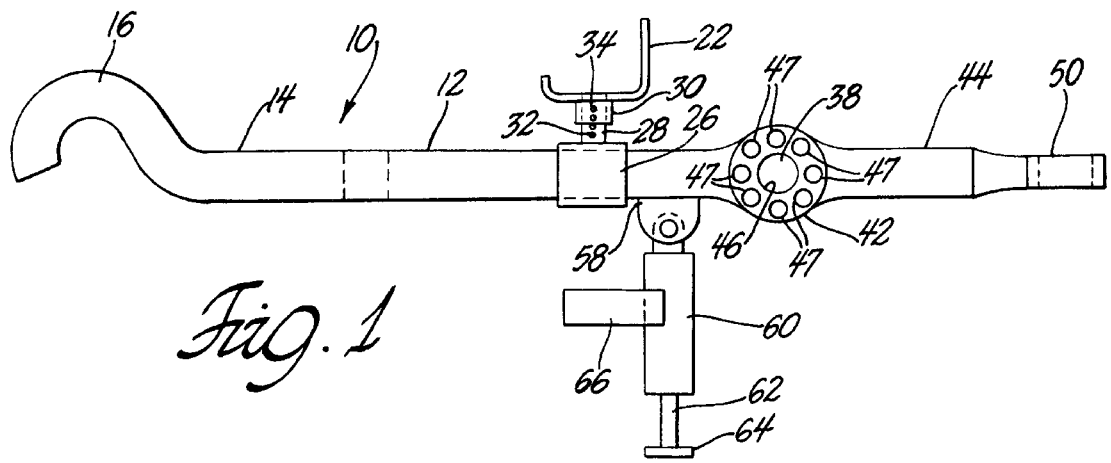
FIG. 1 is a side elevational view of the tow bar showing an optional clip inn the tow bar's jack.
Figure 2:
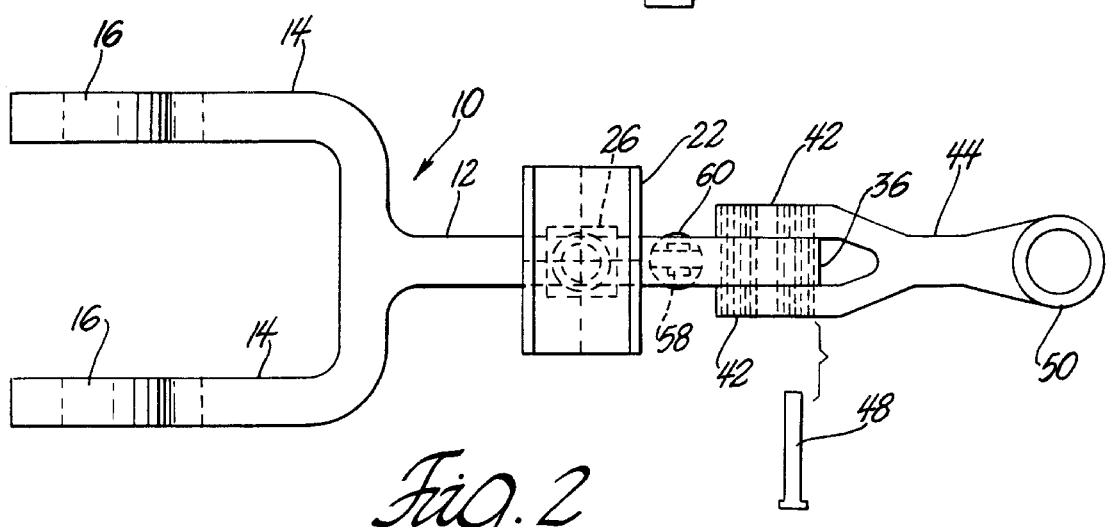
FIG. 2 is a plan view of the tow bar.
Figure 3:
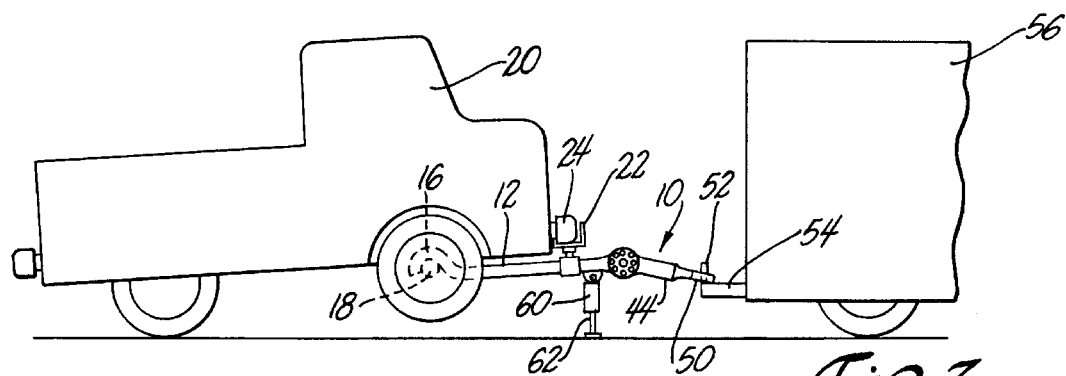
FIG. 3 shows the tow bar connected between a towing vehicle and a towed vehicle. the tow bar's jack having lifted one end of the towed vehicle.
Figure 4:
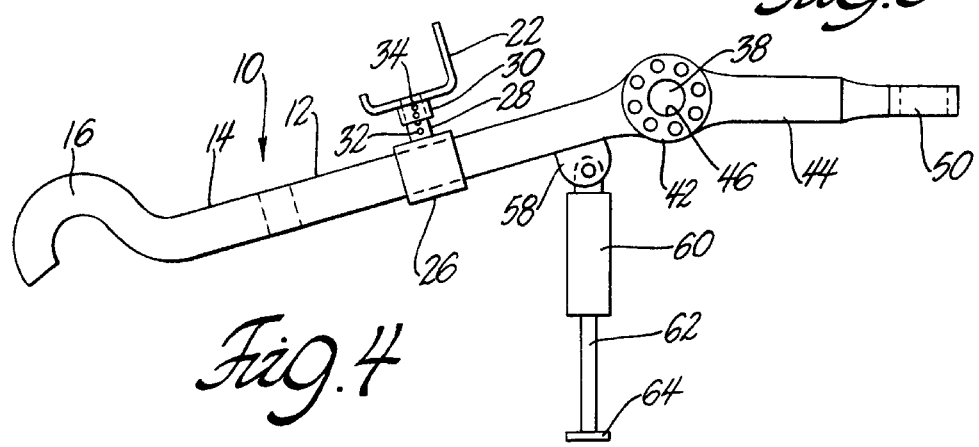
FIGS. 4 and 5 are side elevational views of the tow bar showing varied angular positions of the tow bar's arm and jack relative to the tow bar's shaft.

In FIGS. 1 and 2 is shown an improved tow bar 10 having a cross-sectionally rectangular shaft 12 bifurcating into tines 14. Tines 14 terminate in engagement members such as brackets, seats or hooks which engage frame or undercarriage components of a towed vehicle. In the particular embodiment shown, the engagement members are downwardly opening hooks 16, which fit over axle 18 of towed vehicle 20 (FIG. 3). Sliding on shaft 12 is a cradle 22, which engages bumper 24 of vehicle 20 or else engages a vehicle frame member near axle 18. Cradle 22 is typically connected to shaft by a collar 26 loosely conforming to shaft 12. An apertured stud 28 on collar 26 telescopes with apertured cylinder 30 attached to cradle 22 to effect height adjustment of cradle 22 on shaft 12. One of stud apertures 32 is registered with one of cylinder apertures 34 a standard lock pin (not shown) is inserted through the stud and cylinder to fix their relative positions.

Figure 1A:
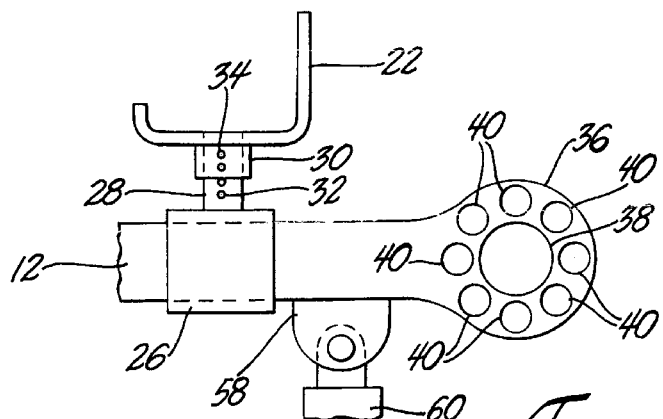
FIG. 1A is a detail view of a terminus of the tow bar's shaft.

As best seen in FIG. 1A, shaft 12 has a rounded, disk-like shaft terminus 36 from which extend axis stubs 38. Satellite apertures 40 extending through terminus 36 are disposed at equiangular intervals about stubs 38. On tow bar arm 44 are disk shaped arm termini 42 (FIG. 1), which are opposed to one another and which sandwich terminus 36 therebetween. Central apertures 46 of termini 42 receive axis stubs 38, so that arm 44 is pivotally joined to shaft 12. Termini 42 have satellite apertures 47 complementary to satellite apertures 40 of terminus 36. Rotating arm 44 on stubs 38 brings the respective satellite apertures into registry with one another, whereupon arm 44 and shaft 12 will be at selected angles with one another. One or more pins 48 can be passed through the satellite apertures so to fix arm 44 and shaft 12 at a selected angle.

At the forward end of arm 44 is an eye 50 or other suitable means to engage a trailer hitch. Eye 50 engages a conventional hitch element such as pintle 52 of hitch assembly 54 on tow vehicle 56 (FIG. 3).

Figure 5:
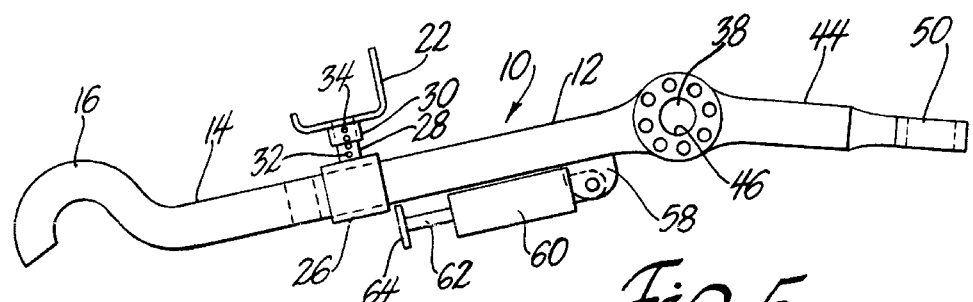

As seen in FIG. 1, there is a pivotal mount 58 for a hydraulic jack 60, mount 58 being on shaft 12 between collar 26 and terminus 36. Jack 60 has an extendable rod or piston 62 and a foot plate 64 at the end thereof. Jack 60 need not be hydraulic but can be of a scissors jack, a ratcheting jack, or any other conventional jack. Jack 60 can be swung up to lie against shaft 12 as seen in FIG. 5, and can be held against shaft 12 by any convenient means. Such means can be, for example, an optional clip 66 (FIG. 1 only) on jack 60 that can clasp shaft 12 to retain jack 60 thereagainst.

Figure 6:
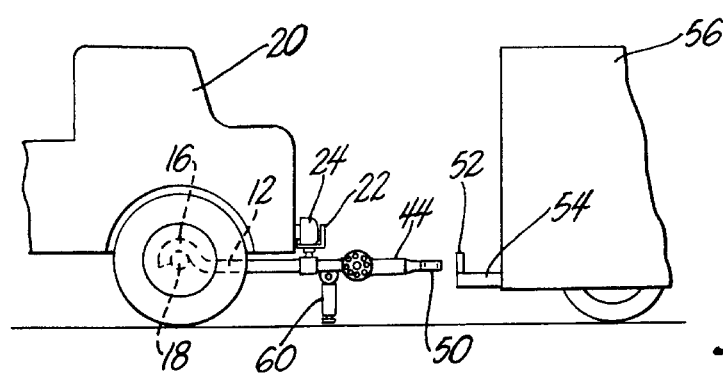
FIG. 6 shows the tow bar after it is engaged to a towed vehicle but before the tow bar is connected to a towing vehicle.

In operation, tow bar 10 is engaged to towed vehicle 20 as shown in FIG. 6 with hooks 16 on axle 18 and cradle 22 holding bumper 24. Arm 44 is lifted and tow vehicle 56 is backed toward tow vehicle 20, and then arm 44 is lowered so that eye 50 engages pintle 52, whereupon vehicle 56 is braked. Jack 50 is actuated so as to lift shaft 12 to the FIG. 3 position, and then pins 48 are passed through the satellite apertures 40 and 47, so as to fix tow bar 10 in its FIG. 3 configuration. Then piston 62 of jack 60 is retracted and jack is swung up against shaft 12.

I desire not to be limited to the exact details of construction or method shown herein since obvious modifications will occur to those skilled in the relevant arts without departing from the spirit and scope of the following claims.

What is claimed is:

1. A tow bar for connecting a vehicle to be towed to a towing vehicle, comprising:

a shaft;

means on the shaft for engaging an undercarriage member of the towed vehicle;

means on the shaft for holding a second member of the towed vehicle;

an arm;

a pivot connection between the arm and the shaft;

means at the pivot connection for locking the arm and shaft at a selected angle between the arm and the shaft;

a jack connected to the shaft;

means for attaching the tow bar to the towing vehicle.

2. The tow bar of claim 1 wherein the engaging means is a downwardly opening hook.

3. The tow bar of claim 2 wherein the hook fits over an axle of the towed vehicle.

4. The tow bar of claim 1 further comprising:

an elongate member extendable from the jack;

a foot plate at the end of the extendable member.

5. The tow bar of claim 1 wherein the pivot connection between the shaft and the arm comprises:
   a first terminus defining a plurality of first satellite apertures;
   a second terminus defining a plurality of second satellite apertures;
   wherein the termini are rotatable relative to one another to bring the first apertures into registry with the second satellite apertures;
   wherein one of the termini is on the arm and another of the termini is on the shaft.

6. The tow bar of claim 1 further including a swing connection between the jack and the shaft.

7. The tow bar of claim 4 wherein the holding means is slidable along the shaft.

8. An articulated tow bar for connecting a vehicle to be towed to a hitch of a towing vehicle, comprising:
   a shaft;
   means on the shaft for engaging an undercarriage member of the towed vehicle;
   an adjustable height cradle on the shaft and slidable along the shaft;
   an arm;
   a pivot connection between the arm and the shaft;
   means at the pivot connection for locking the arm and shaft at a selected angle between the arm and shaft;
   a jack connected to the shaft;
   means on the arm for attaching the tow bar to the hitch of the towing vehicle.

* * * * *